United States Patent
Rushing

(10) Patent No.: US 9,235,823 B2
(45) Date of Patent: Jan. 12, 2016

(54) UNDERGROUND ASSET MANAGEMENT SYSTEM

(71) Applicant: Berntsen International, Inc., Madison, WI (US)

(72) Inventor: William C. Rushing, Sun Prairie, WI (US)

(73) Assignee: Bernsten International, Inc., Madison, WI (US)

( * ) Notice: Subject to any disclaimer, the term of this patent is extended or adjusted under 35 U.S.C. 154(b) by 444 days.

(21) Appl. No.: 13/668,465

(22) Filed: Nov. 5, 2012

(65) Prior Publication Data

US 2014/0125457 A1     May 8, 2014

(51) Int. Cl.
*H04Q 5/22* (2006.01)
*G06Q 10/08* (2012.01)
*G06Q 10/00* (2012.01)
*G06Q 50/06* (2012.01)

(52) U.S. Cl.
CPC ............ *G06Q 10/0833* (2013.01); *G06Q 10/20* (2013.01); *G06Q 50/06* (2013.01)

(58) Field of Classification Search
CPC . G06Q 10/087; G01V 3/08; A61B 2019/448; G06K 19/07
See application file for complete search history.

(56) References Cited

U.S. PATENT DOCUMENTS

| | | | | |
|---|---|---|---|---|
| 5,321,613 A * | 6/1994 | Porter et al. | | 702/1 |
| 5,337,002 A * | 8/1994 | Mercer | | 324/326 |
| 5,819,859 A * | 10/1998 | Stump et al. | | 175/26 |
| 6,388,575 B1 * | 5/2002 | Galloway | | 340/572.1 |
| 6,621,417 B2 * | 9/2003 | Duncan et al. | | 340/572.1 |
| 6,710,741 B2 | 3/2004 | Tucker | | |
| 6,798,379 B2 | 9/2004 | Tucker et al. | | |
| 6,808,116 B1 * | 10/2004 | Eslambolchi et al. | | 235/492 |
| 6,954,072 B1 * | 10/2005 | Schlapp et al. | | 324/329 |
| 6,956,524 B2 | 10/2005 | Tucker et al. | | |
| 6,975,942 B2 * | 12/2005 | Young et al. | | 702/5 |
| 7,002,461 B2 * | 2/2006 | Duncan et al. | | 340/505 |
| 7,197,214 B2 * | 3/2007 | Elkins et al. | | 385/100 |
| 7,391,324 B1 * | 6/2008 | Pflugrath et al. | | 340/572.1 |
| 7,482,973 B2 * | 1/2009 | Tucker et al. | | 342/357.48 |
| 7,728,725 B2 * | 6/2010 | Cecil | | 340/541 |
| 7,788,049 B2 * | 8/2010 | Bryant et al. | | 702/57 |
| 7,834,806 B2 * | 11/2010 | Tucker et al. | | 342/357.64 |
| 7,915,894 B2 * | 3/2011 | Minarovic | | 324/329 |
| 7,920,068 B2 | 4/2011 | Sawyer, Jr. et al. | | |
| 7,928,844 B2 * | 4/2011 | Mackenzie et al. | | 340/572.1 |
| 7,932,827 B2 * | 4/2011 | Chand et al. | | 340/572.1 |
| 7,969,295 B2 * | 6/2011 | Colvero et al. | | 340/505 |

(Continued)

OTHER PUBLICATIONS

Operations Technology Development; Public Improvement Project Coordination with GPS, GIS, and Tags; Summary Report; Pipe & Leak Location; Project No. 1.9b Summary report; admitted prior art.

(Continued)

*Primary Examiner* — Fekadeselassie Girma
*Assistant Examiner* — Son M Tang
(74) *Attorney, Agent, or Firm* — Boyle Fredrickson, S.C.

(57) ABSTRACT

A system for managing underground assets with RFID tags provides for expanded virtual storage by wirelessly linking the field RFID tag reader to a centralized database through a unique series code in the RFID tag. Real-time updating of information about underground assets coordination between multiple users may be accomplished through use of the central database as an information broker.

20 Claims, 5 Drawing Sheets

(56) References Cited

U.S. PATENT DOCUMENTS

| | | | |
|---|---|---|---|
| 7,978,129 B2 | 7/2011 | Sawyer, Jr. et al. | |
| 8,081,112 B2 | 12/2011 | Tucker et al. | |
| 8,111,163 B2* | 2/2012 | Utaka et al. | 340/572.8 |
| 8,144,012 B2* | 3/2012 | Fujita et al. | 340/572.1 |
| 8,144,058 B2 | 3/2012 | Sawyer, Jr. et al. | |
| 8,242,907 B2* | 8/2012 | Butler et al. | 340/572.1 |
| 8,289,129 B2* | 10/2012 | Bauchot et al. | 340/3.51 |
| 8,355,961 B1* | 1/2013 | Ng et al. | 705/28 |
| 8,358,201 B1* | 1/2013 | Haddy | 340/8.1 |
| 8,362,877 B2* | 1/2013 | Bauchot et al. | 340/8.1 |
| 8,368,518 B1* | 2/2013 | Castrovinci | 340/10.51 |
| 8,775,083 B2* | 7/2014 | Young et al. | 702/5 |
| 2002/0034365 A1* | 3/2002 | Vogelsang | 385/100 |
| 2002/0158120 A1* | 10/2002 | Zierolf | 235/375 |
| 2004/0174261 A1* | 9/2004 | Volpi et al. | 340/572.1 |
| 2005/0201450 A1* | 9/2005 | Volpi et al. | 375/150 |
| 2005/0259930 A1* | 11/2005 | Elkins et al. | 385/100 |
| 2006/0079180 A1* | 4/2006 | Sinivaara | 455/41.2 |
| 2006/0109131 A1* | 5/2006 | Sen et al. | 340/572.8 |
| 2009/0237253 A1* | 9/2009 | Neuwirth | 340/572.1 |
| 2009/0309704 A1* | 12/2009 | Chang et al. | 340/10.1 |
| 2011/0050422 A1* | 3/2011 | Pflueger | 340/572.1 |
| 2011/0309931 A1* | 12/2011 | Rose | 340/539.13 |
| 2014/0125457 A1* | 5/2014 | Rushing | 340/5.85 |
| 2014/0176306 A1* | 6/2014 | Lee et al. | 340/10.1 |
| 2014/0353115 A1* | 12/2014 | Baitz et al. | 198/340 |

OTHER PUBLICATIONS

Gas Technology Institute; Underground Facility Pinpointing, Final Report; OTD Operations Technology Development; OTD-06/0001; Jun. 2006; pp. 1-57; DesPlaines, Illinois.

Shigeru Oishi, Koichi Furuta; ESRI User Conference 2006 Technical Report; Ubiquitous GIS Using RFID Tags and ArcPad Mobile GIS; Link to Report, http://proceedings.esri.com/library/userconf/proc06/papers/papers/pap_1863.pdf; p. 1-6; 2006.

* cited by examiner

UNDERGROUND ASSET MANAGEMENT SYSTEM

CROSS REFERENCE TO RELATED APPLICATION

Background of the Invention

The present invention relates to a system for managing underground assets and in particular to a computerized system allowing data fields of arbitrary size to RFID markers attached to or near underground assets.

Underground assets generally include buried structures that need to be identified or located in the future and include pipes, pipe valves, pipe junctions or elbows, associated with water mains, gas lines or sewers, as well as underground conductors such as wires or optical fiber for transmitting electrical power or data. More generally underground assets may include underground building foundations or other structures, surveying markers accidentally or intentionally buried for identification or protection, as well as unused or abandon structures that nevertheless may need to be avoided or located in the future.

Marking the location of underground assets so that they may be located for inspection, maintenance, or avoidance may be done by using traditional surveying techniques and careful maps. Some types of underground assets, even those that have not been intentionally recorded, may be discovered by sensing properties such as ferromagnetism or conductivity of the underground asset at the ground surface by devices such as metal detectors and magnetometers. Such sensing techniques may be augmented by locators, such as strong permanent magnets, that are attached to and/or buried with the underground asset and which are designed for ready location using appropriate surface sensing technology. In these cases, confirmation of the identity of the underground asset requires local excavation for direct inspection.

US patent application 2011/0181,289 hereby incorporated by reference describes an RFID locating and marking system that combines a strong permanent magnet and a radio frequency identification (RFID) tag both of which may be incorporated in RFID marker that may be buried with the underground asset. Sensing of the magnetic field is used to guide fieldworker to the location of the RFID marker. Before excavation, RFID marker may be interrogated to confirm the identity of the located RFID marker and associated underground asset.

Desirably, the RFID tags used in this application are so-called passive RFID tags that do not require a battery that might expire during long periods of underground storage. Such passive RFID tags, instead, obtain electrical power by scavenging some of the electrical power from radio signals that are used to interrogate the RFID tag. This electrical power provides sufficient energy for the RFID tag to respond to radiofrequency interrogation with a radiofrequency signal indicating the contained data of the RFID tag.

Most RFID tags hold "read only data" such as a serial number uniquely identifying the RFID tag and providing other tag specific data. In addition, the RFID tag may include a writable portion that allows additional data to be stored on the RFID locator, for example, data providing additional information about the corresponding underground asset. Typically the storable data is relatively limited, for example, currently two amounts less than 100 bytes. The storable data allows basic information to be recorded about the underground asset, for example a unique underground asset number and short text description.

Typically such descriptive data is written to the RFID marker during a commissioning process before the RFID marker is transported into the field. After commissioning, the RFID marker is usually marked for human readability with a label that allows it to be correctly associated with the desired underground asset. A field worker identifies the appropriate RFID marker to be buried with the underground asset by referring to the human readable tag or label and places the identified RFID marker/tag with the underground asset before burying both.

When an RFID marker/tag is used for the purpose of inspecting or maintenance of the underground asset, for example, the fieldworker may record results of the inspection or maintenance in a paper log or the like identified to the underground asset number stored in the RFID marker. This information may be incorporated into records held in the central office to be reviewed by field personnel before undertaking work on particular underground assets.

Important information about underground assets may be misplaced or failed to be recorded or can be delayed before it is incorporated into central records. Fieldworkers may not have time to review the central records before needing to respond to emergencies related to particular underground assets. Further, work crews associated with different sets of underground assets may not have access each other's records.

Ideally field notes collected about the underground asset might be recorded directly the RFID marker/tag itself at the time of the work, however, current and anticipated future limitations on data storage capacity of RFID tags suitable for this application make this approach impractical. In addition, the lack of compatibility between RFID tag and RFID readers limits the value of recording critical information in the RFID marker/tag in coordinating different work crews associated with different underground assets.

SUMMARY OF THE INVENTION

The present invention provides a method of greatly expanding the amount of data that can be provided by RFID marker/tag and increasing the access to that data by a system "virtual storage" that links each RFID marker/tag to a record of a central database that may be contemporaneously and wirelessly accessed. This linkage may employ a unique index key associated with each RFID marker that matches a corresponding database record, the latter which may be of arbitrarily large size. The resulting high-capacity virtual storage allows detailed recording of field notes about the underground asset and substantially instantaneous access by all field personnel to the data associated with a particular RFID marker without concerns about compatibility between RFID technologies. Centralized storage preserves data against possible damage to the RFID marker/tag and permits improved coordination of field personnel.

More specifically, the present invention provides a system for the management of underground assets comprising or having one or more field identification units communicating wirelessly with a central database server. The field identification units include an RFID reader, a user interface for receiving data from a user and displaying data to a user; a wireless transceiver; and a first electronic computing device communicating with these other elements. The central database server in turn provides a database memory storing records indexed to RFID tag stored data; a communication interface communicating with the field tag identification along a path including the wireless transceiver; and a second electronic computing device communicating with the database memory and the communication interface. The first and second electronic computing device execute stored programs to: (1) read an RFID tag proximate to an underground asset to obtain RFID tag stored data including a tag unique data string; (2) match the tag unique data string to a corresponding record of the database memory; and (3) exchange data between the field tag identification unit and the local database system associated with the corresponding record.

It is thus a feature of at least one embodiment of the invention to provide a high data capacity "virtual storage" in the RFID tag that may be readily accessed in the field. It is another feature of at least one embodiment of the invention to permit substantially immediate centralized access to the data of multiple underground RFID tags.

The unique data string may be stored at least in part as writable RFID tag stored data.

It is thus a feature of at least one embodiment of the invention to permit centralized storage of multiple RFID tag data from multiple vendors despite possible overlap in different RFID tag serial numbers.

The unique data string maybe generated at least in part from other RFID tag stored data written to the RFID tag.

It is thus a feature of at least one embodiment of the invention to provide a method of automatically generating a highly variable serial number suffix or prefix for creating a composite unique index key for linkage to a record of a central database.

The exchanged data may include data from the corresponding record at the central database server which may be displayed on the user interface of the field tag identification unit.

It is thus a feature of at least one embodiment of the invention to provide a simple, field-access to a rich data set related to the underground asset beyond the capacity of the typical RFID tag.

The exchanged data may further or alternatively include data entered by a user of the field tag identification unit through the user interface to be written into the corresponding record.

It is thus a feature of at least one embodiment of the invention to allow field personnel to make contemporaneous additions to the records related to an underground asset with reduced chance of mis-recollection or miss-placing of notes.

The program may implement a login procedure with a user password for permitting data entered by a user of the field tag identification unit to be entered into the corresponding record.

It is thus a feature of at least one embodiment of the invention to provide security necessary for protection of information about critical underground infrastructure.

The program may operate in a mode wherein data may be entered by a user of the field tag identification unit to be entered into the corresponding record only for an RFID marker/tag that has been read with in a predetermined time range.

It is thus a feature of at least one embodiment of the invention to enforce contemporaneous record collection near the time when maintenance or inspection of underground assets occurs.

The programs may log a date and time of exchanged data in the database.

It is thus a feature of at least one embodiment of the invention to capture additional valuable information about management of underground assets linked to the underground assets by an RFID tag locator to increase the security and reliability of the captured data.

The central database server may connect to a user interface for receiving data from a user and displaying data to a user and the second electronic computing device may execute the stored program to receive a tag identification data from the user for a given RFID tag and to create a record in the database memory indexed to a tag unique data string stored in the given RFID tag.

It is thus a feature of at least one embodiment of the invention to provide an integrated commissioning of RFID marker/tags at a central location providing the necessary linkage between RFID markers and the central database so that the RFID marker/tags may be distributed at a later time in the field without the need for field programming or field RFID writing equipment.

The exchanged data between the central database server and the field tag identification unit may include map data providing location and type of underground asset for multiple RFID marker/tags in the database in a map region as superimposed on a map providing terrain features.

It is thus a feature of at least one embodiment of the invention to provide for field accessible maps showing the location of underground assets.

The map data may provide for symbols representing RFID marker/tags, their locations, and a type of underground asset associated with the RFID tag, wherein the type of underground asset is at least one of a function of the underground asset and an ownership of the underground asset and wherein the map. For example, the type of underground asset may include water, electricity, sewer, data cable, gas, buried mineral rights, or right-of-way.

It is thus a feature of at least one embodiment of the invention to provide for a central clearinghouse for information about underground assets enabling multiple field personnel working with different underground assets to receive up-to-date information about other underground assets in the area.

The system may allow user selection of a given symbol through the user interface of the field tag identification unit to display data from the database system from a given record linked to the RFID tag of the given symbol It is thus a feature of at least one embodiment of the invention to provide intuitive selection and ready access to detailed information about underground asset from a convenient map-type interface.

The field tag identification unit further includes a GPS receiver and the exchanged data may be spatial location data based on a GPS signal received at the field marker/tag identification unit.

It is thus a feature of at least one embodiment of the invention to provide automatic data logging of GPS location for confirmation of underground asset identity.

The programs may operate in at least one mode where data may be entered by a user of the field tag identification unit for a corresponding record only for an RFID tag that has been read with in a predetermined spatial location of the RFID tag.

It is thus a feature of at least one embodiment of the invention to enforce spatially proximate recordation data related to an underground asset to eliminate the possibility of mistaken underground asset identity or mis-recollection of information about the underground asset or unauthorized tampering with this information.

The field tag identification unit may further include a camera communicating and the exchanged data may image data from the camera.

It is thus a feature of at least one embodiment of the invention to permit virtual storage of large data files associated with underground asset images or voice recording of information concerning data about damage or repair and the like in an RFID marker/tag.

The first electronic computing device may be a cellular telephone and in one embodiment the invention may include an adapter for receiving and holding for attachment to a wand structure providing the field identification unit.

It is thus a feature of at least one embodiment of the invention to provide for ready field replacement of the electronic computer in the field tag identification unit by adaptation of a standard cell phone.

The cell phone may communicate with the RFID reader via a wireless near field communication transceiver.

It is thus a feature of at least one embodiment of the invention to provide a nonproprietary interface between the cell phone and the remainder of the field tag identification unit to allow a broad option for replacement devices.

The field tag identification unit may further include a sensor for sensing a location of the RFID marker/tag independent of reading of the RFID marker/tag. This sensor, for example, may be a magnetic field sensor communicating with the first electronic computing device to provide a measure of close proximity to a magnet on an RFID marker/tag.

It is thus a feature of at least one embodiment of the invention to provide a system that may both locate and read information about tagged underground assets.

The second program may further executes to review the database memory to generate work order reports and to transmit a human readable translation of the work order report to the field identification unit for display on the field identification unit and to receive data from the field the identification unit indicating completion of items of the work order report, wherein the work order report includes activities associated with specific RFID tags attached to underground assets.

It is thus a feature of at least one embodiment of the invention to make use of centralized and comprehensive storage of RFID tag data to automate maintenance and inspection tasks.

The database may include ownership information indicating ownership of an underground asset associated with an RFID tag and information for contacting an owner of the underground asset.

It is thus a feature of at least one embodiment of the invention to provide for system that allows coordination between different owners of underground assets that may operate together in the same location.

These particular objects and advantages may apply to only some embodiments falling within the claims and thus do not define the scope of the invention.

DETAILED DESCRIPTION OF THE PREFERRED EMBODIMENT

Figure 1:
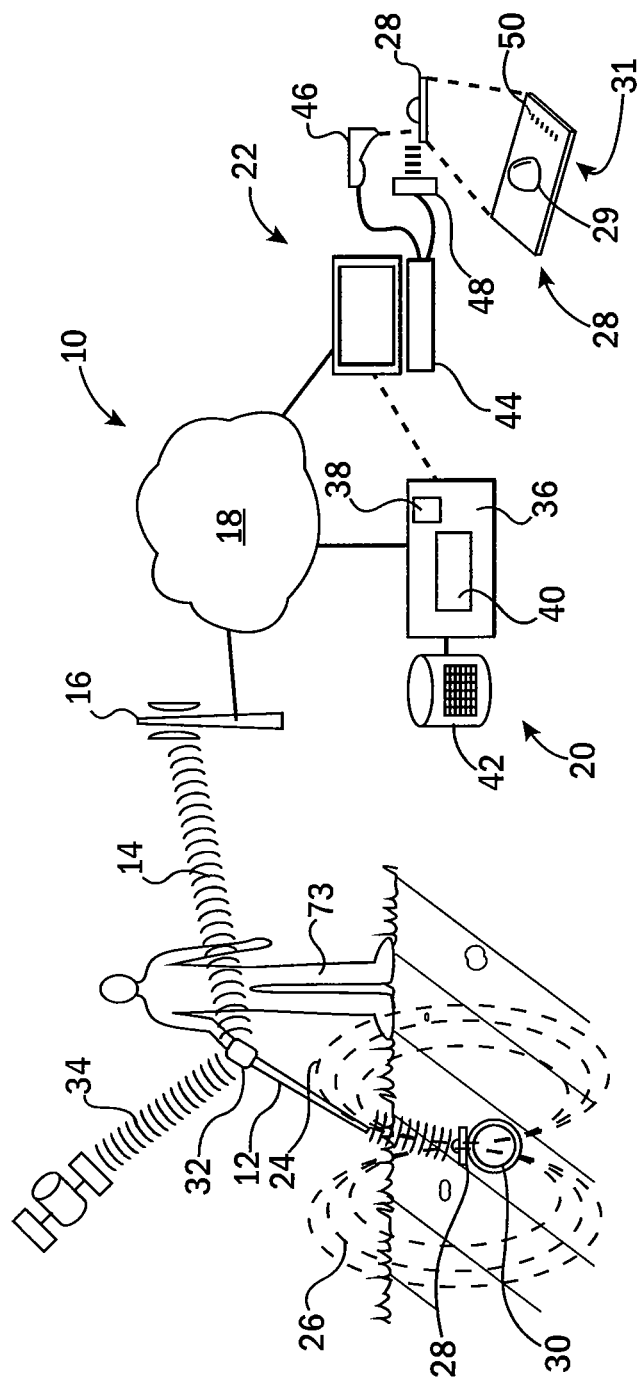
FIG. 1 is a simplified pictorial diagram of a field tag identification unit being used by an operator to locate an underground asset marked with an RFID marker, the field tag identification unit such as may communicate wirelessly with a central database server operating in conjunction with a remote terminal system.

Referring now to FIG. 1, an underground asset management system 10 of the present invention provides generally a field tag identification unit 12 providing wireless connection 14 with underground asset management server 20. This wireless connection 14, for example, may be through a cell telephone infrastructure 16 with the Internet 18 or through an Internet connected wireless router (not shown) and the Internet 18, which may in turn provide for communication with the underground asset management server 20 by conventional wire or wireless connection. Using this wireless connection 14, underground asset management server 20 may communicate with the field tag identification unit 12 to receive data from the field tag and transmit data to the field tag identification unit 12.

The underground asset management server 20 may also communicate with a central terminal 22, either by direct wired connection or through the Internet as shown and may exchange data with the central terminal 22 as will be described below.

Generally, the underground asset management server 20 will provide for one or more server computers 36 including a processor 38 and memory 40 holding a program implementing portions of the present invention as well as a general operating system and Web server software. In addition, the memory 40 may hold a database program implementing a database engine for accessing a database 42, for example, stored on a disk array or the like, as will be discussed below.

The central terminal 22, in one embodiment, may be a desktop or laptop computer 44 of conventional design providing a barcode reader 46 and an RFID tag interrogator 48. An example barcode reader 46 suitable for use with the present invention is the Symbol™ barcode reader commercially available from Motorola of Schaumburg, Ill. An example RFID tag interrogator 48 suitable for use with the present invention is the Thing Magic™ interrogator commercially available from Thing Magic of Cambridge, Mass. The barcode reader 46 and an RFID tag interrogator 48 may be used to read a barcode 50 on the RFID marker 28 during a commissioning process and to program the RFID tag contained in the RFID marker 28, respectively, as will be discussed.

Figure 2:
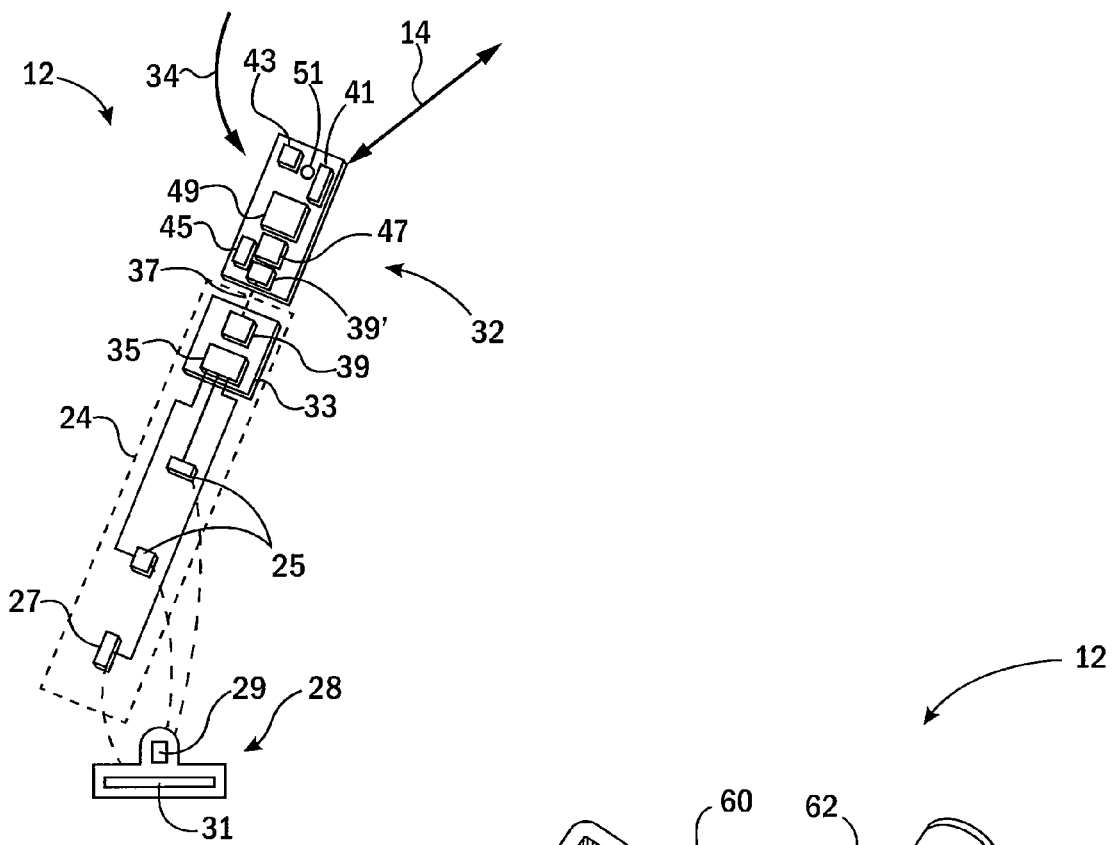
FIG. 2 is a detailed block diagram of the field tag identification unit showing its principal functional components of a sensor array and a computational unit.

Referring to FIGS. 1 and 2, in one embodiment, the field tag identification unit 12 provides a sensor array 24 including, for example, magnetic sensors 25 such as flux gate sensors, for sensing a magnetic field 26 of a magnet 29 on a RFID marker 28 positioned near and underground asset 30. The sensor array 24 may also include an RFID tag interrogator 27 for communicating with an RFID tag 31 within the RFID marker 28. This RFID tag interrogator 27 may be similar RFID tag interrogator 48 or may simply be an RF ID tag reader without writing capability. A sensor array 24 suitable for the present invention is described in co-pending US patent application 2011/0181289 cited above and, for example, may incorporate magnetic sensing technology commercially available from Schonestedt Instrument Company of Kearneysville, W. Va. The sensor array may include a controller board 33 communicating with the magnetic sensors 25 and RFID tag interrogator 27 for processing the signals from each in a microcontroller 35 or the like and communicating those signals, for example, with wires or wirelessly as indicated by arrows 37, through Bluetooth transceiver circuit 39 or other near field communication system.

The field tag identification unit 12 may further include a computational unit 32 communicating with the sensors of the sensor array 24. The computational unit 32 may incorporate wireless communication circuitry 41 for effecting the wireless connection 14 and in one embodiment also includes a GPS receiver 43 for receiving a GPS signal 34 and determining the approximate location of the field tag identification unit 12. Generally, the computational unit 32 will provide for a processor 45 and internal memory 47 that may hold programs, including an application program implementing portions of the present invention. A Bluetooth transceiver circuit 39' in the computational unit 32 may provide communication between the computational unit 32 and the sensor array 24 or a standard electrical connector and direct wiring may be provided for this purpose. Generally, the field tag identification unit 12 will provide for user interface 49, for example, a touchscreen or a graphics display screen and button array, to allow for the display of information to a field operator 73 and the receipt of information from the field operator 73. In one embodiment, the computational unit 32 may include auxiliary user input devices 51, for example, a camera or microphone for similar purpose.

The computational unit 32 may communicate with the sensor array 24 to generally display to the user proximity information derived from the magnetic sensors 24, for example, as derived from magnetic field strength and/or polarity, that may be used, for example, to deduce the location of the RFID marker 28 and ultimately its depth when its location has been determined, and to provide an indication of a reading of an RFID tag 31 by RFID tag interrogator 27. This information may also be communicated wirelessly to the underground asset management server 20 as will be described below.

Figure 3:
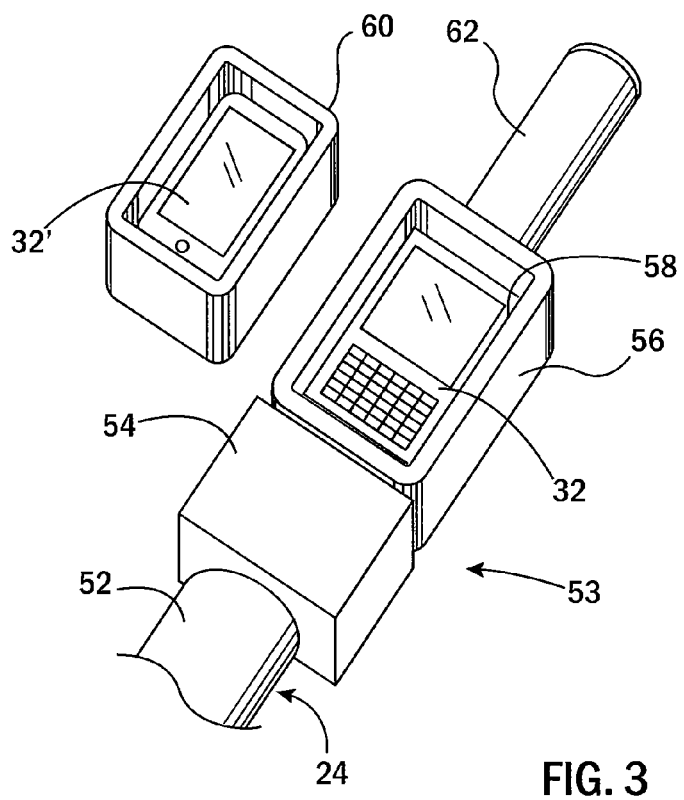
FIG. 3 is a fragmentary perspective view of an upper end of a wand implementation of the field tag identification unit showing a cradle system allowing use of the standard cell phone in place of a hardened industrial computer.

Referring momentarily to FIG. 3, in one embodiment, the field tag identification unit 12 may integrate the sensor array 24 and computational unit 32 in a single wand unit 53 having an elongated body that may be swept over the surface of the earth has grasped by a handle 62 on its upper and. The wand unit 53 provides for a lower sensor shaft 52 holding the sensor array 24. Attached at its upper end is a housing 54, for example, holding the controller board 33. The housing 54 may in turn attached to a cradle 56 that may hold a commercially available computational unit 32 such as the Trimble Nomad 900 LC ruggedized computer commercially available from Trimble of Sunnyvale, Calif. The computational unit 32 may, for example, be held within a pocket 58 by appropriate straps or detent elements (not shown). Alternatively, the present invention also contemplates that the computational unit 32 may be implemented, for example, by a cell phone 32' having GPS and Bluetooth compatibility such as an iPhone or Android™ type smart phone. In this case an adapter cradle 60 may be provided to fit within the pocket 58. An upper end of the cradle 56 may attach to the handle 62 allowing convenient use of the field tag identification unit 12 for locating underground assets 30 per the present invention.

Figure 4:
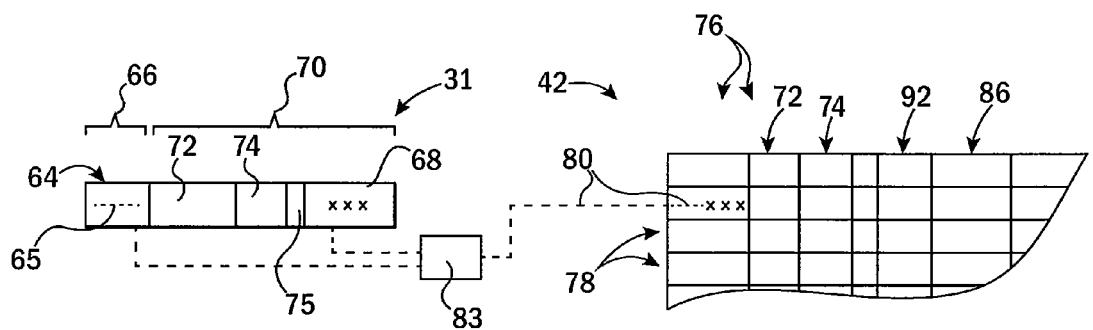
FIG. 4 is a logical diagram of the contained data structure of an RFID tag as may link to a record in a central database through a unique record key.

Referring now to FIGS. 1 and 4, the RFID tag 31 within the RFID marker 28 may provide for a data structure 64 holding data that may be stored by the RFID marker 28. The data structure 64 may include read only data 66, for example, indicating a serial number 65 and manufacturer of the RFID tag 31 and certain communication protocols, the latter information which may be necessary to determine the encoding on the tag 31. The present inventors have determined that among different manufacturers or even within the same manufacturer, there may be repetition of serial numbers 65 and accordingly the present invention contemplates a supplemental series code 68 stored in a readable and writable portion 70 of the data structure 64. This supplemental series code 68 may be selected randomly or maybe derived from other data held in the read/write portion 70. Alternatively, during the commissioning process, the supplemental series code 68 may be selected to make the serial number unique among all records held in the database 42

The remainder of the read/write portion 70 of the data structure 64 may be used to store basic information about an underground asset 30 associated with the RFID marker 28 holding the RFID tag 31. For example, an underground asset number 72 arbitrarily selected by parties managing the underground asset 30 may be stored along with a brief text description 74 of the underground asset 30 contained in a limited number of bytes available in current RFID tags 31. Desirably, a type code 75 will also be provided indicating the type of underground asset 30, for example, water, electricity, sewer, data cable, etc. which may be used to coordinate multiple utility companies or underground asset owners as will be described below. This information may be read directly by the field tag identification unit 12 to provide a field operator 73 with basic information about the associated underground asset 30.

Figure 5:
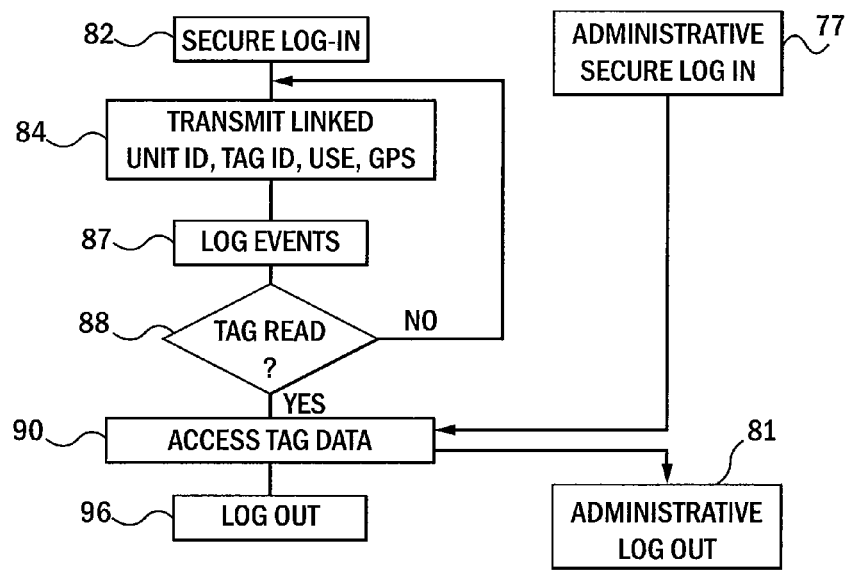
FIG. 5 is a flowchart of principal steps of synchronizing data between an RFID marker and virtual storage held in the central database server.

Referring now generally to FIGS. 4 and 5, the supplemental series code 68, the underground asset number 72, and brief text description 74 may be input at the central terminal 22 during a commissioning process in which this information is entered by an administrator at the computer 44 and written to the RFID tag 31 of the RFID marker 28 using the RFID tag interrogator 48. In a first step of this commissioning process, indicated by process block 77, an administrator may log on to the computer 44 to establish a connection to the server computer 36 through the Internet 18. The logging in process may include the entry of a secure password and ID unique to the administrator to provide controlled access to data that will be stored in the database 42 associated with a given RFID marker 28. As indicated by process block 90, the administrator may then enter information identifying a particular RFID marker 28 in hand before use of the RFID marker 28 in the field. This information is synchronized through the Internet 18 with the central database 42 where provides field values 76 (represented by columns of the depicted table) for particular records 78 (depicted by rows of the depicted table) each record 78 representing a different RFID marker 28.

Each record 78 may be indexed by a unique record index key 80 formed of the serial number 65 and a supplemental series code 68, for example, simply by concatenating the two together with combiner 83. In this way a unique record index key 80 is provided for each RFID marker 28. In one embodiment the supplemental series code 68 may be derived from a human readable barcode 50 (having machine and human readable elements) on the RFID marker 28, or, as described above, may be randomly selected or derived, for example, from other data such as the underground asset number 72. At the conclusion of this commissioning process, indicated by process block 81 administrator may log out.

Once linkage is established between the RFID tag 31 and the database 42, through the unique record index key 80, the database 42 provides for virtual data storage for the RFID marker 28 allowing essentially unlimited capacity of data storage and allowing immediately visibility of that data both in the field and from locations other than those proximate to the RFID marker 28.

Real-time updating of this virtual storage may be accomplished by a field operator 73, for example, as initiated by process block 82 in which the field operator 73 may log on to the system 10 again using a secured name and password unique to the field operator 73. Entry of this information may prompt establishing a secure Internet connection with the server computer 36 at a pre-stored URL and automatic initialization of the database engine for communication with the database 42. The field tag identification unit 12 may automatically engage in real-time communication with the server computer 36 during which it transmits basic linked data indicating an identification of the field tag identification unit 12, the username identified in the login, and GPS coordinates of the field tag identification unit 12 as indicated by process block 84. This information may be automatically populated into the historical log fields 86 of the database 42 to provide ongoing history of use of the field tag identification unit 12 as indicated by process block 87. The database 42 may also record ownership information and contact information for the ownership of the field tag identification unit 12.

At decision block 88, once the field tag identification unit 12 is reading information from an RFID marker 28, the unique record index key 80 may be calculated and the database 42 interrogator to provide the user with access to expanded tag data contained in an associated record 78 of the database 42 as indicated by process block 90. This access allows the field operator 73 to access additional more detailed information about the underground asset 30 associated with the RFID marker 28 and to add information to the record 78 for that RFID marker 28, for example, updating condition of the underground asset 30 associated with the RFID marker 28 in a text description, preparing spoken notes or taking pictures all which may be stored in the record 78. For example, if an underground asset 30 valve is being replaced, the field operator 73 may add data indicating the direction in which the valve opens to aid subsequent maintenance efforts.

The log fields 86 may be used to establish completion of particular maintenance tasks capturing activity with GPS location and possibly images or the like. In one embodiment, permission to write data to the virtual storage of the RFID marker 28, by the field operator 73, may be granted only when the RFID tag 31 of the RFID marker 21 is being read currently, or within a predetermined period of time after such reading, to ensure that the entered data is freshly recorded and not mis-remembered. General read only access may be provided to the field operator 73 at any time and read and write access may be further restricted to certain individuals having particular authorizations indicated by their username and password combinations. Importantly, a GPS location value 92 may be stored associated with each RFID marker 28 when it is first buried with an underground asset 30 to aid in subsequent finding of that RFID marker 28 when used with the magnetic sensing system. The depth of the underground asset 30, and/or the depth of the RFID marker 28, and/or the relative separation between the two may also be recorded in a record 78 either as measured automatically by sensing or entered by the user making manual measurements of depth. All changes to the tag data of record 78 may be logged because of the ample storage space allowed by the virtual storage system of the present invention.

At conclusion of access of the record 78 associated with the particular RFID marker 28, by the field operator 73 user may log out as indicated by process block 96.

Generally, it will be understood that the above steps may be implemented by a combination of software in various described electronic computers. The portion of that software in the field tag identification unit 12, for example, may be in the form of a cell phone application operating within the operating system of the cell phone. In this way if the computational unit 32 is damaged or lost, it may be readily replaced with a standard commercial cell phone that is used to download the application necessary for communication with the remainder of the field tag identification unit 12.

Figure 6:
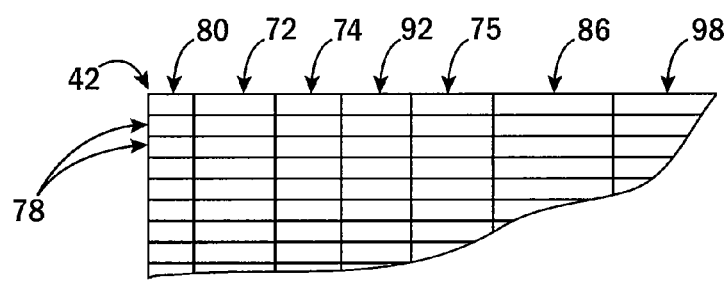
FIG. 6 is an expanded logical diagram of the database of FIG. 4 showing additional record fields useful for coordinating among different parties.

Referring now to FIG. 6, it will be appreciated that the database 42 may provide for an integrating clearinghouse for underground asset information across different entities, for example different businesses, different maintenance services, or different governmental agencies. The database 42 may therefore include a type code 75, for example, identifying an entity owning, controlling or having responsibility for the particular underground asset including contact information for example in the event of emergencies. This type code 75 may generally be provided as an additional field in a given record 78 where the other fields include the previously described unique record index key 80, an assigned underground asset number 72 (selected at the convenience of the particular entity), a brief text description 74 describing the underground asset, a GPS or other coordinate location 92 describing location of the underground asset, data log information 86 and other general information 98, for example, images notes and the like.

Figure 7:
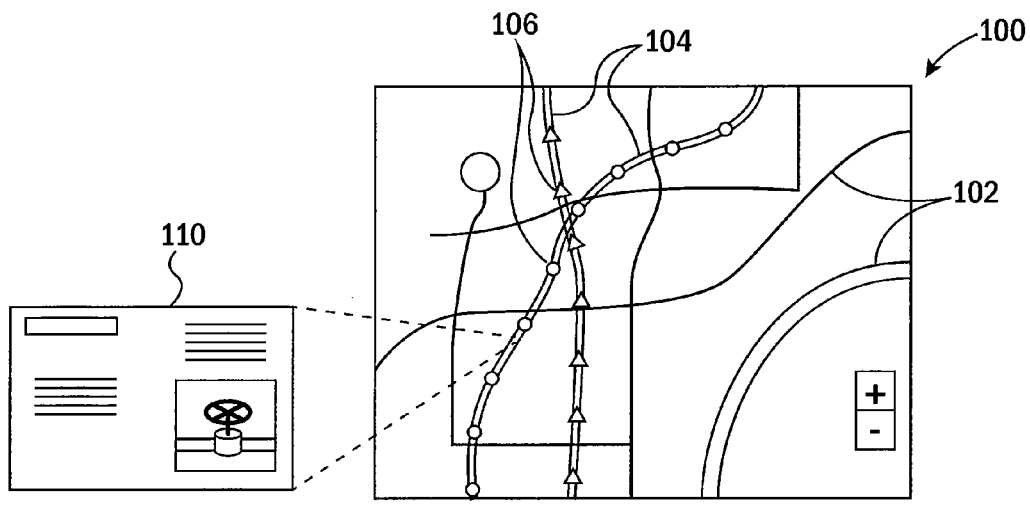
FIG. 7 is a screen shot of a map display as displayed on the field tag identification unit or the terminal associated with the central database server generated from the central database.

Referring now to FIG. 7, this ability of the database 42 to act as an information clearinghouse for coordination of underground assets finds a useful implementation in generating coordinating map 100, for example, to be displayed on the field tag identification unit 12 or a central computer 44. The coordinating map 100 may provide for a standard map overlay 102, for example, showing landscape features, roads, buildings etc. superimposed with utility tracks 104 generated from the database 42. Generally, the utility tracks 104 may comprise a trail of locator icons 106 corresponding to RFID markers 28, the locator icons 106 having a different shape or color according to the type code 75 of the underground asset. The locator icons 106 of a particular type code 75 may be joined by short line segments for clarity to approximately indicate the path of the underground asset in the case of utility or the like. Generally actual intersections between utilities will be marked with RFID markers 28. This coordinating map 100 may be generated dynamically simply by reviewing the data of the database at 42 to obtain necessary coordinate and other information necessary to generate the icons 106 and thus can provide for near instantaneous information about all underground assets in the database 42 in a particular region.

A given locator icon 106 may be selected (for example by clicking with the mouse or touching on a touch screen) to bring up additional information in a text and graphics window 110 generated from the particular record 78 associated with that particular RFID marker 28. Any of the information the record 78 including photographs may be presented in this text and graphic windows 110 as desired by the user.

Figure 8:
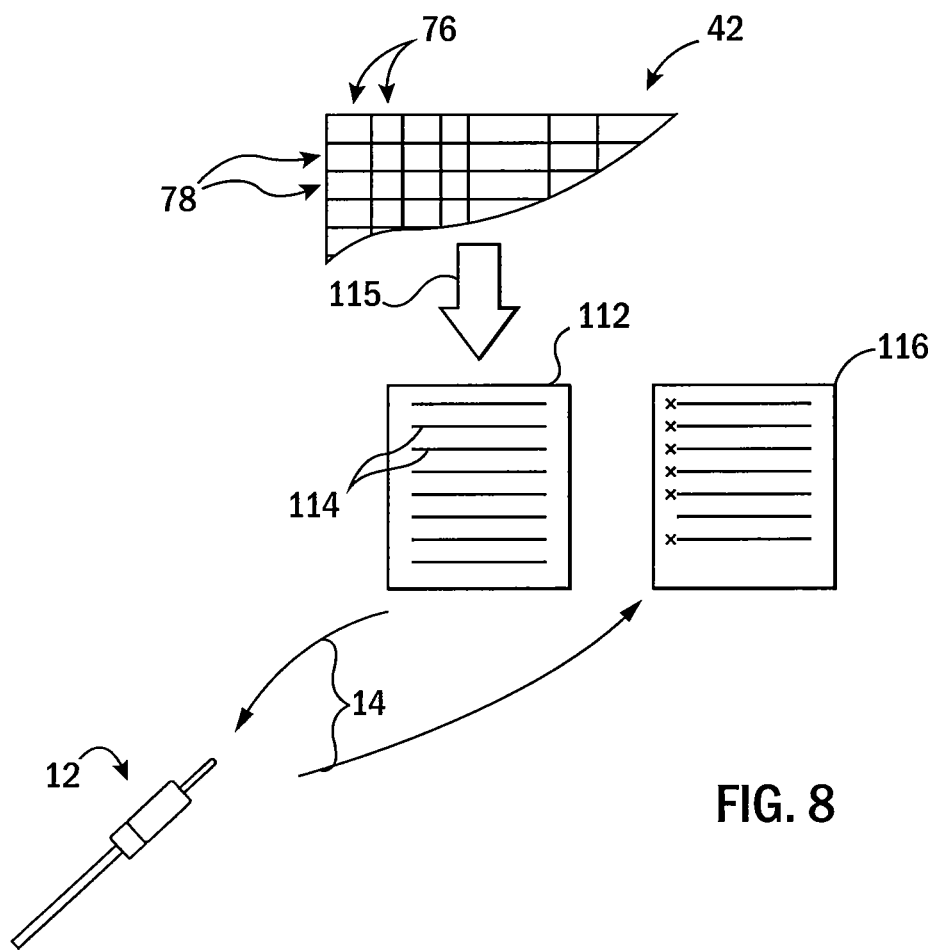
FIG. 8 is a data flow diagram showing automatic generation of work orders from the database of the central database server.

Referring now to FIG. 8, collecting the substantial information associated with the underground assets 30 for each RFID marker 28 in a single database 42 allows the database 42 be used for a variety of purposes including, for example, the generation of work reports 112 listing, for example, particular underground assets associated with RFID markers 28 and activities to be performed on those underground assets. For example, a list of valves to be exercised may be generated using a search through the database 42 to determine those underground assets that are valves and a last date of exercise more than a predetermined time in the past. An automatic work report 112 may then be generated per arrow 115 using conventional database reporting tools listing each underground asset, for example, on a separate line 114 according to RFID marker 28 and record 78. This work report 112 may be printed on paper or preferably transmitted in electronic form to the field tag identification unit 12 to the field operator 73 who may work through the work list and by communication from the field tag identification unit 12 back to the central database 42 may create a completion chart 116 indicating completion of these work tasks.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a processor" can be understood to include one or more processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

I claim:

1. A system for management of underground assets comprising:
   (a) a field tag identification unit providing:
      an RFID reader,
      a user interface for receiving data from a user and displaying data to a user;
      a wireless transceiver; and
      a first electronic computing device communicating with the RFID reader, user interface, and wireless transceiver;
   (b) a central database server remote from the field tag identification unit and providing:
      a database memory storing records indexed to RFID tag stored data;
      a communication interface communicating with the field tag identification unit along a communication channel including the wireless transceiver;
      a second electronic computing device communicating with the database memory and the communication interface;
   wherein the first and second electronic computing device execute programs stored in non-transient media to:
      (1) read an RFID tag proximate to an underground asset to obtain RFID tag stored data including a tag unique data string;
      (2) match the tag unique data string to a corresponding record of the database memory; and
      (3) exchange data between the field tag identification unit and the central database server associated with the corresponding record;
   wherein spatial location data is automatically captured during reading of an RFID tag proximate to an underground asset;
   wherein the exchanged data includes data entered by a user of the field tag identification unit through the user interface and wherein the exchanged data is entered into the corresponding record;
   wherein the programs further execute to operate so that data may be entered by a user of the field tag identification unit into the corresponding, record only for at least one condition of: (1) data that has been entered within a predetermined spatial location of the RFID tag of the corresponding record and (2) an RFID tag that has been read within a predetermined time range before the data was entered.

2. The system of claim 1 wherein the unique data string is stored at least in part as writable RFID tag stored data.

3. The system of claim 1 wherein the exchanged data includes data from the corresponding record, and wherein the data from the corresponding record is displayed on the user interface of the field tag identification unit.

4. The system of claim 1 wherein the programs further execute to implement a login procedure with a user password for permitting data entered by a user of the field tag identification unit to be entered into the corresponding record.

5. The system of claim 1 wherein the first and second electronic computing devices execute the programs to log a date and time of exchanged data in the database.

6. The system of claim 1 further including multiple field identification units each communicating with the database system.

7. The system of claim 1 wherein the central database server further provides a user interface for receiving data from a user and displaying data to a user and wherein the second electronic computing device executes the second program to receive a tag identification data from the user for a given RFID tag and to create a record in the database memory indexed to a tag unique data string stored in the given RFID tag.

8. The system of claim 1 wherein the field tag identification unit further includes a GPS receiver and wherein the exchanged data is spatial location data based on a GPS signal received at the field tag identification unit.

9. The system of claim 1 wherein field tag identification unit further includes a camera communicating with the first electronic computing device and wherein the exchanged data includes image data from the camera.

10. The system of claim 1 wherein the first electronic computing device is a cellular telephone and further including an adapter for receiving and holding for attachment to a wand structure providing the field identification unit.

11. The system of claim 10 wherein the cellular telephone and communicates with the RFID reader via a wireless near field communication transceiver.

12. The system of claim 1 wherein the field tag identification unit further includes a sensor for sensing a location of the RFID tag independent of reading of the RFID tag.

13. The system of claim 12 wherein the sensor is a magnetic field sensor communicating with the first electronic computing device to sense a magnet on an RFID marker holding a magnet and the RFID tag to provide at least one of a measure of proximity to the magnet on the RFID marker, strength of a magnetic field of the magnet, and polarity of a magnetic field of the magnet.

14. The system of claim 1 wherein the second program further executes to review the database memory to generate work order reports and to transmit a human readable translation of the work order report to the field identification unit for display on the field identification unit and to receive data from the field identification unit indicating completion of items of the work order report, wherein the work order report includes activities associated with specific RFID tags attached to underground assets.

15. The system of claim 14 wherein the work order is generated by reviewing the database memory for deadlines associated with scheduled maintenance of underground assets.

16. The system of claim 1 wherein the database includes ownership information indicating ownership of an underground asset associated with an RFID tag and information for contacting an owner of the underground asset.

17. The system of claim 1 wherein the exchanged data indicates at least one of the group selected from: depth to the buried asset, depth to an RFID marker holding the RFID tag, and relative depth separation between the RFID marker and the underground asset.

18. A system for management of underground assets comprising:
(a) a field tag identification unit providing:
an RFID reader,
a user interface for receiving data from a user and displaying data to a user;
a wireless transceiver; and
a first electronic computing device communicating with the RFID reader, user interface, and wireless transceiver;
(b) a central database server remote from the field tag identification unit and providing:
a database memory storing records indexed to RFID tag stored data;
a communication interface communicating with the field tag identification unit along a communication channel including the wireless transceiver;
a second electronic computing device communicating with the database memory and the communication interface;
wherein the first and second electronic computer device execute programs stored in non-transient media to:
(1) read an RFID tag proximate to an underground asset to obtain RFID tag stored data including tag unique data string;
(2) match the tag unique data string to a corresponding record of the database memory; and
(3) exchange data between the field tag identification unit and the central database server associated with the corresponding record;
wherein the exchanged data includes data from the corresponding record, and wherein the data from the corresponding record is displayed on the user interface of the field tag identification unit;
wherein the exchanged data includes map data providing location and type of underground asset for multiple RFID tags in the database in a map region as superimposed on a map providing terrain features; and
wherein the map data provides for symbols representing RFID tags, their locations, and a type of underground asset associated with the RFID tag, wherein the type of underground asset is at least one of a function of the underground asset and an ownership of the underground asset.

19. The system of claim 18 wherein the type of underground asset include water, electricity, sewer, data cable, gas, buried mineral rights, or right-of-way.

20. The system of claim 18 wherein the map provides for symbols representing RFID tags and their locations, and wherein the first and second programs execute to allow user selection of a given symbol through the user interface of the field tag identification unit to display data from the database system from a given record linked to the RFID tag of the given symbol.

* * * * *